United States Patent [19]

Stein et al.

[11] 4,371,024

[45] Feb. 1, 1983

[54] EMERGENCY RUNNING RING FOR PNEUMATIC VEHICLE TIRES

[75] Inventors: Hermann Stein, Wuppertal-Barmen; Ulrich Piepenbrink, Schwelm, both of Fed. Rep. of Germany

[73] Assignee: Vorwerk & Sohn GmbH & Co. KG, Wuppertal-Barmen, Fed. Rep. of Germany

[21] Appl. No.: 233,136

[22] Filed: Feb. 10, 1981

[30] Foreign Application Priority Data

Mar. 8, 1980 [DE] Fed. Rep. of Germany ....... 3008972

[51] Int. Cl.³ .......................... B60C 17/00; B60C 5/00
[52] U.S. Cl. ................................. 152/158; 152/330 L; 152/330 RF; 152/339; 152/378 R; 152/388; 206/205
[58] Field of Search ............. 152/158, 330 L, 330 RF, 152/334, 339, 340, 151, 152, 153, 155–157, 378 R, 388, 366, 400, 401; 206/219, 205, 210, 207, 438, 69

[56] References Cited

U.S. PATENT DOCUMENTS

| 3,872,907 | 3/1975 | Curtiss, Jr. et al. | 152/158 |
|---|---|---|---|
| 3,903,946 | 9/1975 | French et al. | 152/330 RF |
| 3,942,573 | 3/1976 | Lawrence | 152/330 RF |
| 4,091,854 | 5/1978 | French et al. | 152/158 |
| 4,263,953 | 4/1981 | Miceli | 152/158 |
| 4,295,509 | 10/1981 | Stein | 152/158 |

FOREIGN PATENT DOCUMENTS

| 11698 | 3/1982 | European Pat. Off. . |
|---|---|---|
| 2130259 | 1/1972 | Fed. Rep. of Germany . |
| 2252027 | 5/1973 | Fed. Rep. of Germany . |
| 2712242 | 10/1977 | Fed. Rep. of Germany . |
| 2085827 | 12/1971 | France . |

*Primary Examiner*—William A. Powell
*Assistant Examiner*—Thomas Bokan
*Attorney, Agent, or Firm*—Schwartz, Jeffery, Schwaab, Mack, Blumenthal & Koch

[57] ABSTRACT

The invention relates to an emergency running ring for pneumatic tires mounted on vehicle rims. A lubricant is contained in cavities formed by virtue of the shape of the ring, or is contained in auxiliary members mounted in openings in the ring or mounted on the surface of the ring. In all instances, the loss of tire pressure due to emergency conditions causes the lubricant to be released so as to reduce the friction between the inner face of the tire cover and the ring.

11 Claims, 13 Drawing Figures

EMERGENCY RUNNING RING FOR PNEUMATIC VEHICLE TIRES

BACKGROUND OF THE INVENTION

The invention relates to an emergency running ring of rubber or another elastomer for use with tubeless air-inflated tires for commercial vehicles mounted on flat-base rims. The ring is formed with several radial bores for the admission of air, and a plurality of circumferential hollow cavities filled with a lubricant and sealed. The cavities are opened only in the case of loss of air, which results in the tire casing pressing on the emergency running ring by means of lever action, thereby releasing the lubricant for the purpose of reducing friction between the ring and the tire.

An emergency running ring of this type is known and described in U.S. application Ser. No. 97,414 of Hermann Stein, filed Nov. 26, 1979, now U.S. Pat. No. 4,295,509 issued Oct. 20, 1981. According to this application, circumferential hollow cavities are arranged on both sides of the emergency running ring and filled with a lubricant. The cavities are sealed by means of sealing lips which fit against the inner wall of the tire and are pressured against the inner wall by the air pressure prevailing in the tire. In a further known emergency running ring, the cavities filled with lubricant are arranged between the outer side and a central, circumferential groove of the emergency running ring. The sealing lips, together with the edge zones of the emergency running ring, always seal one of the lubricant outlet channels leading from the cavity into the inner space of the tire, by means of a lateral prestress generated in the course of the mounting of the tire.

In both cases, the opening of the cavities filled with lubricant is effected by a certain lever action resulting from the emergency. Actual practice has shown, however, that due to the higher centrifugal force in the tire at high velocities, the lubricant may be released to a varying degree even prior to the occurrence of an emergency.

SUMMARY OF THE INVENTION

The object of the present invention is to eliminate the aforementioned deficiency by a more reliable sealing of the cavities and, furthermore, to provide processes that are less expensive in manufacturing and simpler with respect to the assembly techniques. These objectives are attained by providing cavities which are sealed by the configuration of the emergency running ring and/or auxiliary means in the tire which is under the pressure of compressed air.

The invention comprises several embodiments. In one embodiment, the emergency running ring is formed with a centered, circumferential, relief-cut recess, and is further formed with a sealing lip and a counter lip at each side thereof, within which the lubricant is received. The auxiliary means consists of sealing the cavity formed by the circumferential sealing lip and counter lip as noted, and additionally providing a circumferential strip of foil, which serves as the intended fracture zone in the case of the failure of the tire. The lubricant is safely stored in this instance until it is needed in an emergency, as it is in the example of embodiments described hereinafter, wherein the sealing of the cavities is effected solely by auxiliary means. For example, the cavity may consist of hoses connected at their ends with each other and inserted under prestressing in a circumferential groove provided on the surface of the emergency running ring and adapted to the configuration of the hose. Such auxiliary means are inexpensive, and simplify installation of the emergency running ring.

The advantages of the invention will be readily apparent from the following description and the application drawings.

BRIEF DESCRIPTION OF THE APPLICATION DRAWINGS

FIG. 1 is a cross-sectional view of one form of emergency running ring, shown mounted in a pneumatic tire, and FIGS. 2, 2a and 3–12 illustrate other embodiments of emergency rings, shown unmounted and in cross-section.

DETAILED DESCRIPTION OF THE PREFERRED EMBODIMENTS

Figure 1:
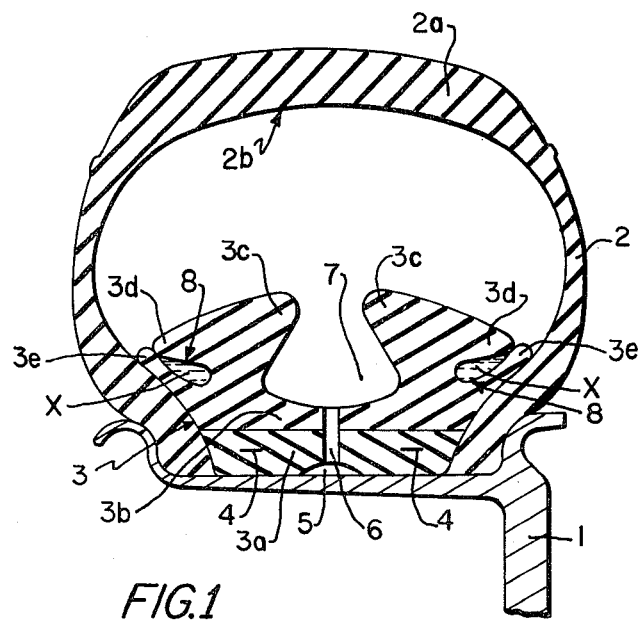

The emergency running element 3 is shown in FIG. 1 installed on a flat-base rim 1 in a tubeless pneumatic tire 2. The running element consists of a ring made of rubber or other elastomers with a plurality of circumferential recesses. The root or base 3a of the emergency running ring 3 is reinforced in a known manner by two or more bundles of steel wire 4 in order to obtain a solid seat on the rim. The base 3a of the ring may consist, in a known manner and in order to further secure its seat on the rim 1, of an elastomer that is harder than the upper part 3b of the emergency running ring. On its bottom side the ring base 3a has a circumferential recess 5, from which several passage channels 6, distributed over the circumferences of the ring, lead to the inner space of the tire, in order to insure the path of the air from the valve. The upper part 3b of the ring has a circumferential cut recess which forms a relief 7. The resulting overhung parts or flanges 3c are formed at each side with a sealing lip 3d which is pressed against a counter lip 3e, thereby enclosing with said counter lip a cavity 8 that is filled with the lubricant X. The closing lips 3d are pressured solidly against the sealing lips 3e which fit against the inner wall of the tire by the pressure of the air.

In case of the loss of the air from the tire due to an external effect, the inner wall 2b of the tire casing 2a descends onto the emergency ring 3 and pressures the two overhanging parts 3c of the emergency running ring into the recess 7, whereby the closing lips 3d are raised by a lever action in order to release the lubricant. The lubricant liquifies at operating temperatures of the tire in excess of 40° C. to reduce the friction of parts between the inner wall of the tire and the surface of the emergency running ring. The lubricant may consist of a substance that has neither a swelling nor other damaging effects on elastomers, such as, for example, polyglycols or salts of fatty acids. Such lubricants are well known in the art and per se form no part of the present invention. Reference is made to a publication of the firm Chemische Werke Hüls A. G., Marl, Federal Republic of Germany, entitled "Polydiole Polywachse" (Polydioles Polywaxes), dated May, 1977, for a disclosure of lubricants of the type specified.

In view of the state of the art, as represented by the application above referred to, in FIG. 1 only the sealing of the cavity 8 effected by the closing lip 3d and a sealing lip 3e should be considered a characteristic of the invention.

Figure 2:
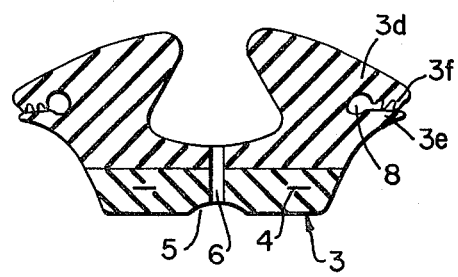

A modified emergency running ring according to the invention is shown in FIG. 2, wherein the closing lip is further provided with three denticulated tooth-like sealing lips 3f, said sealing lips being pressured tightly against the counter lip 3e by the air pressure in the tire, in order to prevent the unintentional and premature emergence of the lubricant (not shown) from the cavity 8. A similar lubricating effect is achieved consequent to loss of air from the tire.

Figure 2A:
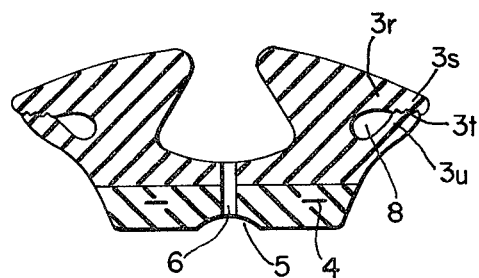

In the embodiment of FIG. 2a, the closing lip 3r has a denticulated inner surface 3s, which tightly engages an adjacent correspondingly denticulated surface 3t of the counter lip 3u. Both lips serve to seal the cavity 8 filled with the lubricant (not shown) in the tire which is under pneumatic pressure.

Figure 3:
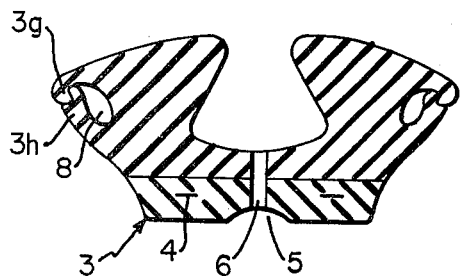

FIG. 3 shows a further form of emergency running ring, wherein the end of the closing lip is hook-like in shape at 3g in its cross section and engages a recess of the counter lip 3h, that is slightly relief-cut and corresponds in shape to the contour of the hook-shaped end 3g when a lateral pressure is applied to the counter lip, for example during the installation of the emergency running ring. In case of the loss of air of the tire, the closing lip 3g is released by the lever action from its engagement with the counter lip 3h and the lubricant (not shown) stored in the cavity formed by the two lips is released.

Figure 4:
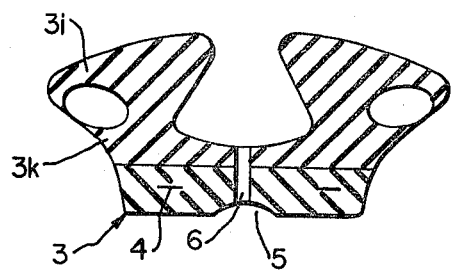

Another modification for retaining the lubricant in confinement until an eventual emergency of the tire occurs is shown in FIG. 4. Herein the closing lip 3i and the counter lip 3k are connected with each other at their ends by means of a thin skin produced by the vulcanizing of the base material during the manufacture of the emergency running ring, said thin skin serving as the intended fracture location for the emergency operation of the tire. The cavity enclosed by the thin skin may be produced in such a manner that the cavity formed in the course of the manufacturing of the raw blank of the emergency running ring is retained during the vulcanizing phase, for example, by the introduction of a blowing agent, with the blowing agent being released after vulcanizing and the lubricant (not shown) filled in.

Figure 5:
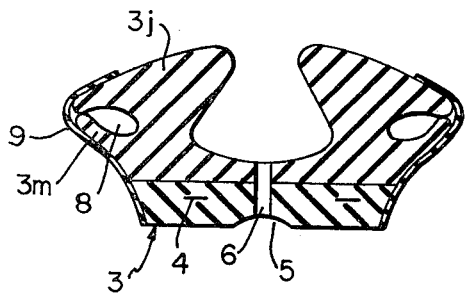

FIG. 5 shows an emergency running ring having closing lips 3j and counter lips 3m such that in the unmounted state only a slight gap leading to the cavity filled with the lubricant is left open. The gap is then sealed with the aid of a thin, vulcanized circumferential elastomer strip 9, for example, by means of bonding with a cold vulcanizing adhesive. In the case of an emergency, the strip of elastomer is torn open by the lever action.

Figure 6:
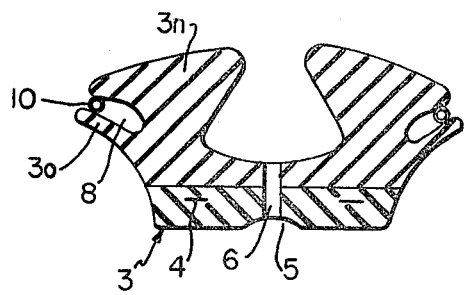

In the emergency running ring according to FIG. 6, an auxiliary means is again used to seal the lubricant in the cavity. Prior to the mounting of the emergency running ring, a strand 10 of an elastic material, interconnected at both ends and corresponding in its length to the circumference of the circumferential cavity 8, is loosely inserted in the outer end of said cavity, and, if desired, additionally adhesively secured to the closing lip 3n or the counter lip 3o. The counter lip is pressured against the strand 10 during the mounting process and tightly seals the cavity 8 with the aid of the strand. An elastomer hose may be used in place of the strand 10. During emergency conditions, depression of the overhanging flanges moves the sealing lips and permits lubricant to pass around the strands 10.

Figure 7:
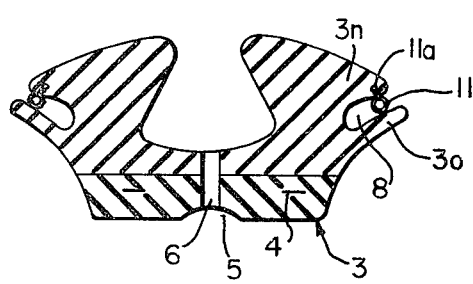

As a variant of the strand 10, FIG. 7 shows a hose 11, which by means of a circumferential or interrupted projection 11a, is pressed into a circumferential recess in the closing lips 3n corresponding to the projection 11a, for fastening the hose in the emergency ring. During the mounting of the emergency ring, as in the case of FIG. 6, the counter lip 3o is pressed against the hose 11 which seals the cavity. It will be understood that the hose 11 may be pressured with the same effect into a corresponding circumferential recess of the counter lip 3o.

Figure 8:
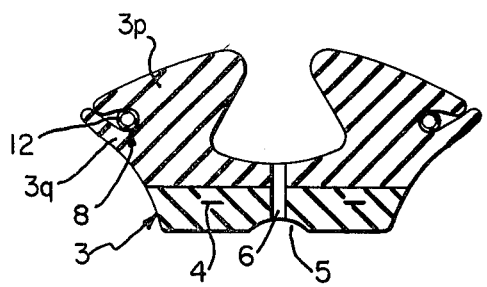

In the emergency running ring according to FIG. 8, a hose 12 of polyethylene or suitably shaped hose segments is closed or interconnected at both ends and filled with the lubricant. The hose 12 is inserted in the cavity 8 formed by the closing lip 3p and the counter lip 3q, prior to the mounting of the emergency ring. The counter lip 3q is pressed during the mounting process against the closing lip 3p and maintains the hose 12 in position. An emergency resulting in loss of air as described opens the cavity 8 and permits the hose 12, or hose segments, to emerge from the cavity 8 so that the hose is destroyed in the internal space of the tire by friction, squeezing by inner wall 2b, and heat between the tire casing and the emergency ring, thus releasing the lubricant.

Figure 9:
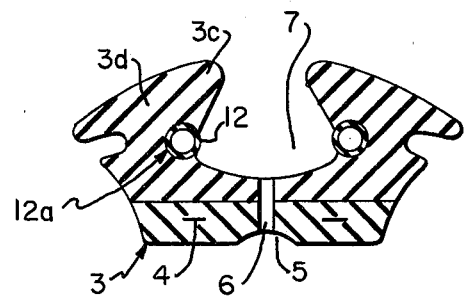

Referring to the embodiment shown in FIG. 9, the overhanging parts 3c forming the center recess 7 of the emergency ring 3 are relief-cut on either side so that a cavity 12a is created. A hose 12 filled with lubricant (not shown) is jammed or pressed in the cavity, with a small peripheral portion of the hose being exposed. The pressure prevailing during emergency runninhg forces the overhanging parts 3c into the recess 7 and destroys the hoses, which in turn release the lubricant.

Figure 10:
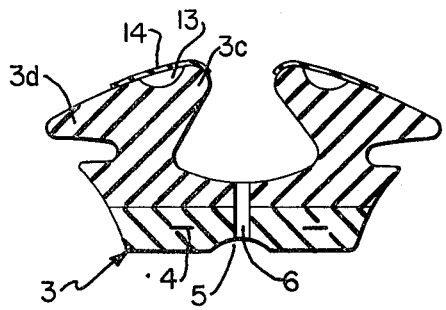

The emergency running ring according to FIG. 10 has in the surface of each of the overhanging parts 3c a circumferential groove 13, each of which is filled with a lubricant and covered by an elastomer sheathing 14, with the sheathing being applied by means, for example, of a cold vulcanizing adhesive. Pressure and friction forces resulting from emergency running on the surface of the overhanging parts 3c very rapidly destroy the elastomer film whereby the lubricant is released.

Figure 11:
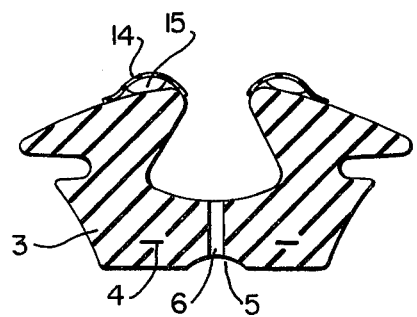

FIG. 11 is similar to FIG. 10 but the cavities which store the lubricant are defined by hoses 15, each having interconnected ends or being comprised of segments of hose sealed at their ends. The hoses are fastened to the overhanging parts by means of an adhesive or an elastomer foil 14 applied with a cold-vulcanizing adhesive mass. The foil and/or hose are destroyed in the case of an emergency by pressure, friction and squeezing, whereupon the lubricant is released.

Figure 12:
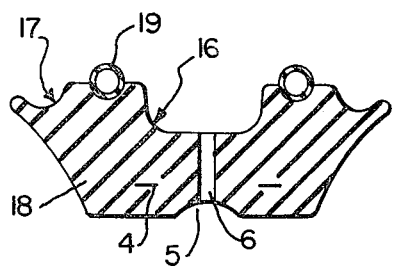

Another embodiment of the emergency running ring is shown in FIG. 12, which differs somewhat in its configuration from the aforementioned embodiments of FIGS. 10 and 11. The ring 18 is formed at its center with a circumferential recess 16, which is not relief-cut and therefore is not intended to provide the opening of a cavity as a result of lever action. On either side of the emergency ring another circumferential recess 17 is provided. The recesses 16 and 17 are only intended to reduce the mass and thus the weight of the emergency running ring. Between the recesses 16 and 17 the emergency running ring 18 is formed with grooves adapted to receive hoses 19 filled with the lubricant. The hoses 19, their ends interconnected, are placed under prestress in the grooves, whereby the hose protrudes, by at least one-half of its surface, from the surface of the emergency running ring. In the emergency operation of the tire, the hoses are destroyed by the pressure of the tire casing on the emergency ring 18, thereby releasing the lubricant. The hoses 19 may be additionally secured by adhesive joining or covering with an elastomeric film, as described hereinabove.

With respect to the last mentioned embodiments of the emergency running ring according to the invention, all variations of the configuration of the emergency running ring are within the scope of the present invention, wherein, independently of the shape of the emergency ring, cavities filled with the lubricant and sealed, are applied circumferentially or in segments over the periphery of the ring, or are inserted in the surface of the emergency ring. The cavities are destroyed in case of an emergency resulting in total loss of tire pressure, thereby releasing the lubricant.

We claim:

1. An emergency running ring for a tubeless pneumatic tire adapted to be mounted on a tire rim, comprising
   (a) a bottom reinforced base for mounting the ring on such rim,
   (b) at least one radial opening in said ring to permit air to be admitted to the interior of the tire,
   (c) cavity means formed in said ring adapted to be filled with a lubricating material,
   (d) sealing lips and counter lips directly engaging each other for closing said cavity means and sealing said lubricant therein when said tire is mounted on said rim and under pressure, one of said sealing lips and counter lips being formed with a denticulated sealing surface thereby to provide a plurality of sealing faces between said lips, thereby sealing the cavity filled with lubricant,
   (e) flange means integrally formed with said sealing lips and extending radially upwardly with respect to said sealing lips for engagement by the inside of the tire during loss of air,
   said sealing lips and flange means being formed and arranged such that when said flange means are depressed, lever action causes said sealing lips to move so as to open said cavities and permit said lubricating material to be released to reduce friction between said tire and said running ring.

2. The emergency running ring of claim 1 wherein the contiguous surfaces of both of said sealing lips and counter lips are provided with complementary denticulated surfaces which are tightly engaged when said tire is under pressure, thereby sealing said lubricant.

3. An emergency running ring for a tubeless pneumatic tire adapted to be mounted on a tire rim, comprising:
   (a) a bottom reinforced base for mounting the ring on such rim,
   (b) at least one radial opening in said ring to permit air to be admitted to the interior of the tire,
   (c) cavity means formed in said ring adapted to be filled with a lubricating material,
   (d) sealing lips and counter lips directly engaging each other for closing said cavity means and sealing said lubricant therein when said tire is mounted on said rim and under pressure, each of said sealing lips having a hook-like end configuration, said counter lips being relief cut and adapted to the contour of said hook-like end configurations of said sealing lips whereby the cavity filled with lubricant is tightly sealed when the tire is under pressure,
   (e) flange means integrally formed with said sealing lips and extending radially upwardly with respect to said sealing lips for engagement by the inside of the tire during loss of air,
   said sealing lips and flange means being formed and arranged such that when said flange means are depressed, lever action causes said sealing lips to move so as to open said cavities and permit said lubricating material to be released to reduce friction between said tire and said running ring.

4. An emergency running ring for a tubeless pneumatic tire adapted to be mounted on a tire rim, comprising
   (a) a bottom reinforced base for mounting the ring on such rim,
   (b) at least one radial opening in said ring to permit air to be admitted to the interior of the tire,
   (c) cavity means formed in said ring adapted to be filled with a lubricating material,
   (d) sealing lips and counter lips directly engaging each other for closing said cavity means and sealing said lubricant therein when said tire is mounted on said rim and under pressure,
   (e) flange means integrally formed with said sealing lips and extending radially upwardly with respect to said sealing lips for engagement by the inside of the tire during loss of air,
   said sealing lips and flange means being formed and arranged such that when said flange means are depressed, lever action causes said sealing lips to move so as to open said cavities and permit said lubricating material to be released to reduce friction between said tire and said running ring, and a thin, circumferential strip bonded to the sides of said ring and enclosing the sealing space between said sealing lips and said counter lips, said strip fracturing during an emergency condition causing loss of tire pressure, thereby freeing the lubricant from the cavities.

5. An emergency running ring for a tubeless pneumatic tire adapted to be mounted on a tire rim, comprising
   (a) a bottom reinforced base for mounting the ring on such rim,
   (b) at least one opening in said ring to permit air to be admitted to the interior of the tire,
   (c) cavity means formed in said ring adapted to be filled with a lubricating material,
   (d) sealing lips and counter lips partially defining said cavity means, a circumferential strand of elastomeric material inserted in the outer end of said cavity means and serving to seal said lubricant therein when said tire is mounted on said said rim and under pressure,
   flange means integrally formed with said sealing lips and extending raidally upwardly with respect to said sealing lips for engagement by the inside of the tire cover during loss of air,
   whereby when said flange means are depressed, said sealing lips are moved so as to permit said lubricating material to be released past said strands to reduce friction between said tire cover and said track ring.

6. The emergency running ring of claim 5 wherein said strands are formed with projections which extend into circumferential recesses provided therefor in one of said sealing or counter lips, thereby to securely anchor said strands in sealing position at the ends of said cavities.

7. An emergency running ring for a tubeless pneumatic tire adapted to be mounted on a tire rim, comprising
 (a) a bottom reinforced flange for mounting the ring on such rim,
 (b) at least one opening in said ring to permit air to be admitted to the interior of the tire,
 (c) cavity means formed in said ring,
 (d) hose means positioned in said cavity means, said hose means containing lubricant,
 flange means integrally formed with said ring and adapted to be engaged by the inside of the tire during loss of air, such engagement causing destruction of said hose means and permitting said lubricant to be released to reduce friction between said tire and said running ring.

8. The emergency running ring of claim 7 wherein said cavity means is defined by sealing lips and counter lips integrally formed with said ring, with said hose means filled with lubricant being positioned in said cavity means prior to mounting said ring in said tire, said flange means when engaged by the inside of the tire causing said sealing lips to move away from said counter lips so as to open said cavity means and permit said hose means to emerge therefrom.

9. The emergency running ring of claim 7 wherein said flange means partially define at their axially inner ends a central recess, an opening formed at each side of said recess, and a relatively thin walled hose positioned in each opening, each hose being filled with lubricant, said flange means being depressed by the inside of the tire during loss of air, thereby forcibly destroying said hose and releasing said lubricant.

10. The emergency ring of claim 7 wherein said flange means are formed with openings in the upper surface thereof, and hose means positioned in said openings, said hose means being filled with lubricant, said hoses being destroyed consequent to loss of air in the tire, thereby releasing the lubricant.

11. An emergency running ring for a tubeless pneumatic tire adapted to be mounted on a tire rim, comprising
 (a) a bottom reinforced flange for mounting the ring on such rim,
 (b) at least one opening in said ring to permit air to be admitted to the interior of the tire,
 (c) flange means adapted to be engaged by the inside of the tire during loss of air,
 (d) lubricant containing means associated with the upper surface of said flange means for receiving a lubricating material, said lubricant containing means comprising circumferential grooves formed in the upper surface of said flanges, and
 (e) means for confining said lubricating material comprising tape means covering said grooves,
 whereby when said flange means are depressed, said confining means are destroyed thereby releasing the lubricant.

* * * * *